(12) United States Patent
Zhou

(10) Patent No.: US 12,098,101 B2
(45) Date of Patent: Sep. 24, 2024

(54) MICRO-SURFACING SEALING COAT MIXTURE AND PREPARATION METHOD THEREOF

(71) Applicant: JIANGSU ZENGGUANG NEW MATERIAL TECHNOLOGY CO., LTD, Nantong (CN)

(72) Inventor: Qingyue Zhou, Nantong (CN)

(73) Assignee: JIANGSU ZENGGUANG NEW MATERIAL TECHNOLOGY CO., LTD, Nantong (CN)

( * ) Notice: Subject to any disclaimer, the term of this patent is extended or adjusted under 35 U.S.C. 154(b) by 597 days.

(21) Appl. No.: 17/441,577

(22) PCT Filed: May 16, 2019

(86) PCT No.: PCT/CN2019/087257
§ 371 (c)(1),
(2) Date: Sep. 21, 2021

(87) PCT Pub. No.: WO2020/191900
PCT Pub. Date: Oct. 1, 2020

(65) Prior Publication Data
US 2022/0153645 A1     May 19, 2022

(30) Foreign Application Priority Data
Mar. 26, 2019   (CN) .......................... 201910233733.2

(51) Int. Cl.
*C04B 26/32* (2006.01)
*C04B 26/26* (2006.01)
*C08L 95/00* (2006.01)

(52) U.S. Cl.
CPC .............. *C04B 26/32* (2013.01); *C04B 26/26* (2013.01); *C08L 95/005* (2013.01); *C08L 2555/52* (2013.01); *C08L 2555/86* (2013.01)

(58) Field of Classification Search
CPC ....... C04B 26/26; C04B 26/32; C08L 95/005; C08L 2555/52; C08L 2555/86
See application file for complete search history.

(56) References Cited

FOREIGN PATENT DOCUMENTS

| CN | 101830667 A | 9/2010 |
| CN | 105906234 A | 8/2016 |
| CN | 108070269 A | 5/2018 |
| KR | 101684216 B1 | 12/2016 |

OTHER PUBLICATIONS

Merijs Meri, Remo & Abele, A. & Zicans, J. & Haritonovs, Viktors. (May 2019). Development of polyolefine elastomer modified bitumen and characterization of its rheological and structural properties. 10.1201/9781351063265-9. (Year: 2019).*
International Search Report for PCT Patent Application No. PCT/CN2019/087257, mailed Jan. 8, 2020.

* cited by examiner

*Primary Examiner* — Alexandra M Moore
(74) *Attorney, Agent, or Firm* — Andrus Intellectual Property Law, LLP

(57) ABSTRACT

Disclosed is a micro-surfacing sealing coat mixture, comprising the following raw materials in parts by weight: 10-20 parts of a cationic emulsified asphalt, 5-7 parts of an ethylene-1-octene copolymer, 3-6 parts of an organic silicone resin, 8-12 parts of a filler, 80-90 parts of an aggregate, 2-4 parts of a ditertiarybutyl peroxide, 20-30 parts of water, and 0.5-2 parts of an accelerator. The method for preparing the micro-surfacing sealing coat mixture comprises: weighing raw materials other than the filler, aggregate and water, adding to a high-speed shear emulsifier and mixing at a temperature of 170-175° C. for 20-35 min, then continuously shearing at 3000-3500 r/min for 60 min to obtain a modified emulsified asphalt; cooling the modified emulsified asphalt to 20-30° C., adding the filler, aggregate and water thereto, and adding the resulting mixture to a mixer to mix evenly to obtain the micro-surfacing sealing coat mixture.

18 Claims, No Drawings

MICRO-SURFACING SEALING COAT MIXTURE AND PREPARATION METHOD THEREOF

CROSS-REFERENCE TO RELATED APPLICATION(S)

This patent application is a U.S. national stage of PCT/CN2019/087257, filed on May 16, 2019, which claims the benefit and priority of Chinese Patent Application No. 201910233733.2 filed on Mar. 26, 2019, the disclosure of which is incorporated by reference herein in its entirety as part of the present application.

TECHNICAL FIELD

The present disclosure relates to a pavement material and a preparation method thereof, in particular to a micro-surfacing sealing coat mixture and a preparation method thereof.

BACKGROUND ART

The thin slurry seal is a thin layer formed by mixing emulsified asphalt, coarse and fine aggregates, fillers, water and additives according to the design ratio into a thin slurry mixture and paving them on the original road surface using mechanical equipment. The traditional thin slurry seal is mainly composed of ordinary emulsified asphalt, which has the advantages of smooth surface, comfortable driving, good wear resistance, low vibration, low noise, etc. However, the highest summer temperature in most areas of China is as high as 35-40° C., and the highest temperature of asphalt pavement reaches 60-65° C. or above, under the action of high temperature, the asphalt pavement rapidly deforms and is damaged seriously, thus bringing huge inconvenience to traffic. Therefore, ordinary emulsified asphalt slurry seal is far from being able to meet the needs of the increasing development of highway maintenance, especially the deficiency of high and low temperature performance of ordinary emulsified asphalt. It is therefore necessary for us to develop a new type of emulsified asphalt to meet the needs of road construction, and the main method to solve this problem is improving the thermal stability of the emulsified asphalt slurry seal through modification.

The existing modified emulsified asphalt slurry seal refers to the asphalt mixture added with rubber, resin, high molecular polymer, ground rubber powder and other modifiers, or the asphalt mixture that the asphalt is slightly oxidized to improve the performance of the asphalt. The pavement paved with said asphalt has good durability and abrasion resistance, and to a certain extent, it can achieve the effect of no softening at high temperature and no cracking at low temperature. Due to the high-intensity and long-term solar radiation in high-temperature areas, convective heat exchange occurs in the pavement, which makes heat transfer between each layer of the pavement. In particular, the asphalt pavement is prone to produce large temperature stress under high-temperature conditions, which leads to the occurrence of temperature fatigue of the pavement. The existing modified emulsified asphalt slurry seal has the disadvantages of poor heat resistance, poor waterproof effect, and reflection cracks are prone to appear.

SUMMARY

In view of the above shortcomings, the objective of the present disclosure is to develop a micro-surfacing sealing coat mixture, with excellent heat resistance and waterproof performance.

The technical solution of the present disclosure is summarized as follows:

A micro-surfacing sealing coat mixture, comprising the following raw materials in parts by weight: 10-20 parts by weight of a cationic emulsified asphalt, 5-7 parts by weight of an ethylene-1-octene copolymer, 3-6 parts by weight of an organic silicone resin, 8-12 parts by weight of a filler, 80-90 parts by weight of an aggregate, 2-4 parts by weight of a ditertiarybutyl peroxide, 20-30 parts by weight of water, and 0.5-2 parts by weight of an accelerator.

In some embodiments, the aggregate comprises 60-70 wt % of coarse aggregate and 30-40 wt % of fine aggregate.

In some embodiments, the coarse aggregate is basalt or limestone.

In some embodiments, the fine aggregate is expanded perlite, diatomaceous earth, or cinder.

In some embodiments, the particle size of the coarse aggregate is 5-10 mm, and the particle size of the fine aggregate is 0.1-1 mm.

In some embodiments, the filler comprises 20-26 wt % limestone and 74-80 wt % titanium nitride.

In some embodiments, the accelerator comprises 60-65 wt % of triethylene diamine and 35-40 wt % of sulfolane.

In some embodiments, the micro-surfacing sealing coat mixture further comprises 1-3 parts by weight of vinyl palmitate.

In some embodiments, the micro-surfacing sealing coat mixture further comprises 1-3 parts by weight of methyl trifluoropropyl silicone oil.

A method for preparing a micro-surfacing sealing coat mixture, comprising:
  (1) weighing cationic emulsified asphalt, ethylene-1-octene copolymer, organic silicone resin, ditertiarybutyl peroxide, triethylenediamine, sulfolane, vinyl palmitate, and methyl trifluoropropyl silicone oil, sending them to a high-speed shear emulsifier, stirring at 170-175° C. for 20-25 min, and then continuously shearing for 60 min at 3000-3500 r/min to obtain a modified emulsified asphalt;
  (2) cooling the modified emulsified asphalt to 20-30° C., adding limestone, titanium nitride, aggregate, and water thereto and sending the resulting mixture to a mixer to mix evenly to obtain the micro-surfacing sealing coat mixture.

The beneficial effects of the present disclosure are as follows:
  (1) The micro-surfacing sealing coat mixture of the present disclosure improves the internal structure of emulsified asphalt on a microscopic level by optimizing its chemical composition. It has excellent resistance to water wash-off, and anti-permeability and stress buffering properties. The micro-surfacing sealing coat mixture of the present disclosure can delay the generation of reflective cracks and realize the limited sliding of the cement concrete pavement on the multi-efficiency coupling layer.

(2) In the present disclosure, the heat resistance, chemical corrosion resistance and water resistance of asphalt are improved by adding ethylene-1-octene copolymer; the thermal oxidation stability, weather resistance, waterproof, salt-spray resistant, anti-mildew performance of the mixture are improved by adding organic silicone resin; the performance of wear resistance, waterproof, buffering, corrosion resistance and heat resistance are improved by adding filler limestone and titanium nitride; the fracture resistance of the sealing coat mixture are improved by adding triethylenediamine and sulfolane as accelerators, and after cooling solidification, the heat resistance, structural stability and toughness of the sealing coat mixture have been greatly improved; the thermal stability and flow properties of the sealing coat mixture are improved by adding vinyl palmitate.

DETAILED DESCRIPTION OF THE EMBODIMENTS

The present disclosure will be further described in detail below with reference to the embodiments, so that those skilled in the art can implement it with reference to the text of the description.

The present disclosure provides a micro-surfacing sealing coat mixture, comprising the following raw materials in parts by weight: 10-20 parts by weight of a cationic emulsified asphalt, 5-7 parts by weight of an ethylene-1-octene copolymer, 3-6 parts by weight of an organic silicone resin, 8-12 parts by weight of a filler, 80-90 parts by weight of an aggregate, 2-4 parts by weight of a ditertiarybutyl peroxide, 20-30 parts by weight of water, and 0.5-2 parts by weight of an accelerator.

Cationic emulsified asphalt is processed by a variety of surfactants, cationic shale inhibitors and asphalt with a certain range of softening point through a special process. The performance of cationic emulsified asphalt in the present disclosure is shown in Table 1:

TABLE 1

| The performance of cationic emulsified asphalt | | | | | |
|---|---|---|---|---|---|
| Items Categories | | Unit | Test value | Technical standard | Test method |
| Demulsification speed | | | slow | slow | T0658 |
| Electric charge | | | cation | cation (+) | T0653 |
| Engela viscosity E25 | | | 5 | 2-30 | T0622 |
| Standard viscosity of asphalt C25.3 | | S | 18 | 10-60 | T0621 |
| Remaining amount on sieve (1.18 mm-sieve) | | % | 0.06 | ≤0.1 | T0652 |
| Content of evaporated residue | | % | 62.4 | ≥60 | T0651 |
| Property of evaporated residue | Softening point | ° C. | 54.2 | ≥45 | T0606 |
| | Needle penetration (100 g, 25° C., 5 s) | 0.1 mm | 72 | 45-150 | T0604 |
| | Ductility (15° C.) | cm | 47 | ≥40 | T0606 |
| | Solubility (trichloroethylene) | % | 99.8 | ≥97.5 | T0607 |
| Storage stability | 1 d | % | 0.6 | ≤1 | T0655 |
| | 5 d | % | 2.1 | ≤5 | |

In the present disclosure, ethylene-1-octene copolymer is added to improve the heat resistance, chemical corrosion resistance and water resistance of asphalt; organic silicone resin is added to improve the thermal oxidation stability, weather resistance, waterproof, salt-spray resistance, anti-mildew performance of the mixture; ditertiarybutyl peroxide is used as a cross-linking agent to produce chemical bonds between linear molecules, so that linear molecules are connected to each other to form a network structure, thus improving the strength, heat resistance and water resistance of the micro-surfacing sealing coat. Ethylene-1-octene copolymer and organic silicone resin undergo cross-linking reaction by themselves under the action of cross-linking agent, and then grafted with cationic emulsified asphalt. The formed network structure wraps the cationic emulsified asphalt and the fillers dispersed in the cationic emulsified asphalt to prevent phase separation of the micro-surfacing sealing coat material, namely, no segregation and delamination will occur after storage at high temperature, thus providing excellent tensile and fracture resistance, heat and water resistance of the pavement material. The filler and aggregate in the micro-surfacing sealing coat acts as a structural framework layer to improve the abrasion resistance and mechanical strength of the pavement. The aggregate should be selected as nearly cubic basalt or limestone with a single particle size, which is hard, dry and clean, without weathered particles, and is rolled by cone crusher or impact crusher. It should meet the technical requirements of Table 2.

TABLE 2

| | Quality requirements for the coarse and fine aggregates of the micro-surfacing sealing coat | | | |
|---|---|---|---|---|
| Materials | Technical index | Unit | Technical requirements | Test method |
| Coarse aggregate | Crushing strength | % | ≤28 | JTG E42 T0316 |
| | Los Angeles weared value | % | ≤30 | JTG E42 T0317 |
| | Apparent relative density | — | ≥2.5 | JTG E42 T0304 |
| | Water absorption | % | ≤3.0 | JTG E42 T0304 |
| | Robustness | % | ≤12 | JTG E42 T0314 |
| | Soft rock content | % | ≤5 | JTG E42 T0320 |
| | Needle flake particle content | % | ≤18 | JTG E42 T0312 |
| | Content of particle less than 0.075 mm (water washing method) | % | ≤1 | JTG E42 T0310 |
| Fine aggregate | Apparent relative density | t/m$^3$ | ≥2.45 | JTG E42 T0328 |
| | Sand equivalent | % | ≥50 | JTG E42 T0334 |
| | Mud content (content of less than 0.075 mm) | % | ≤5 | — |
| Mineral aggregate | Sand equivalent | % | ≥50 | JTG E42 T0334 |

In another embodiment, the aggregate includes 60-70 wt % of coarse aggregate and 30-40 wt % of fine aggregate. An intermittent grading method is adopted to make the aggregate particles arranged in a regular and orderly manner, so as to achieve the characteristics of uniform internal organization, stable product performance, high comprehensive strength, and good wear resistance and aging resistance. Therefore, the micro-surfacing mixture has the ability to resist water wash-off, prevent road surface water from penetrating into the base layer, buffer stress, delay the generation of reflective cracks, and realize the limited sliding of cement concrete pavement on the multi-efficiency connecting layer.

In another embodiment, the coarse aggregate is basalt or limestone.

In another embodiment, the fine aggregate is expanded perlite, diatomaceous earth, or cinder.

In another embodiment, the particle size of the coarse aggregate is 5-10 mm, and the particle size of the fine aggregate is 0.1-1 mm After adding these aggregates, the performance of the micro-surfacing sealing coat is further improved. Further, it mainly improves the service life of the mixture after solidification. More specifically, it improves the low-temperature cracking resistance and abrasion resistance of the asphalt, which enables the asphalt to remain non-expanding, non-shrinking and non-cracking even in extreme climates. Under the condition that the above basic formula ratio remains unchanged, the addition amount of these coarse aggregates and fine aggregates should be limited, and the particle size of these fillers should also be limited in consideration of actual and effective application results and manufacturing costs.

In another embodiment, the filler includes 20-26 wt % of limestone and 74-80 wt % of titanium nitride. In order to make the material obtain the performance of abrasion resistance, waterproof, buffering, corrosion resistance and heat resistance, the material itself is modified in the present disclosure, and limestone and titanium nitride having synergistic performance of wear resistance, waterproof, buffering, corrosion resistance and heat resistance are introduced; herein, limestone has outstanding buffering performance and corrosion resistance, and titanium nitride has outstanding abrasion resistance, waterproof performance and heat resistance.

In another embodiment, the accelerator comprises 60-65 wt % of triethylenediamine and 35-40 wt % of sulfolane. By using triethylenediamine and sulfolane as accelerators, the fracture resistance of the sealing coat mixture can be improved, and the heat resistance, structural stability and toughness of the sealing coat mixture after cooling and solidification are greatly improved.

In another embodiment, the sealing coat mixture further includes 1-3 parts by weight of vinyl palmitate. The addition of vinyl palmitate can improve the thermal stability and flow properties of the sealing coat mixture.

In another embodiment, the sealing coat mixture further includes 1-3 parts by weight of methyl trifluoropropyl silicone oil. By adding methyl trifluoropropyl silicone oil with a specific viscosity, there forms a hydrophobic layer over the sealing coat, which plays a hydrophobic role and reduces the interfacial adhesion of the water phase. The hydrophobic layer is similar to the surface effect of a lotus leaf and cannot be infiltrated by water. At the same time, it also plays a role in adjusting the viscosity and fluidity of the entire mixed material, so that each aggregate and filler is evenly coated with the emulsified asphalt to play a waterproof role.

A method for preparing a micro-surfacing sealing coat mixture, comprising:
(1) weighing cationic emulsified asphalt, ethylene-1-octene copolymer, organic silicone resin, ditertiary-butyl peroxide, triethylenediamine, sulfolane, vinyl palmitate and methyl trifluoropropyl silicone oil, sending them to a high-speed shear emulsifier, stirring at 170-175° C. for 20-25 min, and then continuously shearing for 60 min at 3000-3500 r/min to obtain a modified emulsified asphalt;
(2) cooling the modified emulsified asphalt to 20-30° C., adding limestone, titanium nitride, aggregate, and water thereto and adding the resulting mixture to a mixer to mix evenly to obtain the micro-surfacing sealing coat mixture.

Specific examples and comparative examples are listed below:

Example 1

A micro-surfacing sealing coat mixture, comprised the following raw materials in parts by weight: 10 parts by weight of a cationic emulsified asphalt, 5 parts by weight of an ethylene-1-octene copolymer, 3 parts by weight of an organic silicone resin, 8 parts by weight of a filler, 80 parts by weight of an aggregate, 2 parts by weight of a ditertiarybutyl peroxide, 20 parts by weight of water, 0.5 parts by weight of an accelerator, 1 parts by weight of a vinyl palmitate, and 1 parts by weight of a methyl trifluoropropyl silicone oil.

The aggregate included 60 wt % coarse aggregate and 40 wt % fine aggregate, the coarse aggregate was basalt, the fine aggregate was expanded perlite, the particle size of the coarse aggregate was 5 mm, and the particle size of the fine aggregate was 0.1 mm; the filler included 20 wt % limestone and 80 wt % titanium nitride; and the accelerator was 60 wt % triethylenediamine and 40 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 170° C. for 20 min, and then continuously sheared for 60 min at 3000 r/min to obtain a modified emulsified asphalt;
(2) the modified emulsified asphalt was cooled to 20° C., then limestone, titanium nitride, aggregate, and water were added thereto and the resulting mixture was sent to a mixer to mix evenly to obtain the micro-surfacing sealing coat mixture.

Example 2

A micro-surfacing sealing coat mixture, comprised the following raw materials in parts by weight: 12 parts by weight of a cationic emulsified asphalt, 6 parts by weight of an ethylene-1-octene copolymer, 5 parts by weight of an organic silicone resin, 10 parts by weight of a filler, 85 parts by weight of an aggregate, 3 parts by weight of a ditertiarybutyl peroxide, 24 parts by weight of water, 1 parts by weight of an accelerator, 2 parts by weight of a vinyl palmitate, and 2 parts by weight of a methyl trifluoropropyl silicone oil.

The aggregate included 64 wt % coarse aggregate and 36 wt % fine aggregate, the coarse aggregate was limestone, the fine aggregate was diatomaceous earth, the particle size of the coarse aggregate was 8 mm, and the particle size of the fine aggregate was 0.5 mm; the filler included 24 wt % limestone and 76 wt % titanium nitride; the accelerator included 63 wt % triethylenediamine and 37 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 172° C. for 24 min, and then continuously sheared for 60 min at 3200 r/min to obtain a modified emulsified asphalt;
(2) the modified emulsified asphalt was cooled to 25° C., then limestone, titanium nitride, aggregate, and water were added thereto and the resulting mixture was sent to a mixer to mix evenly to obtain the micro-surfacing sealing coat mixture.

Example 3

A micro-surfacing sealing coat mixture, comprised the following raw materials in parts by weight: 20 parts by weight of a cationic emulsified asphalt, 7 parts by weight of an ethylene-1-octene copolymer, 6 parts by weight of an organic silicone resin, 12 parts by weight of a filler, 90 parts by weight of an aggregate, 4 parts by weight of a ditertiarybutyl peroxide, 30 parts by weight of water, 2 parts by weight of an accelerator, 3 parts by weight of a vinyl palmitate, and 3 parts by weight of a methyl trifluoropropyl silicone oil.

The aggregate included 70 wt % coarse aggregate and 30 wt % fine aggregate, the coarse aggregate was basalt, the fine aggregate was cinder, the particle size of the coarse aggregate was 10 mm, and the particle size of the fine aggregate was 1 mm; the filler included 26 wt % limestone and 74 wt % titanium nitride; and the accelerator included 65 wt % triethylenediamine and 35 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 175° C. for 25 min, and then continuously sheared for 60 min at 3500 r/min to obtain a modified emulsified asphalt;
(2) the modified emulsified asphalt was cooled to 30° C., then limestone, titanium nitride, aggregate, and water were added thereto and the resulting mixture was sent to a mixer to mix evenly to obtain the micro-surfacing sealing coat mixture.

Comparative Example 1

A micro-surfacing sealing coat mixture, comprised the following raw materials in parts by weight: 10 parts by weight of a cationic emulsified asphalt, 3 parts by weight of an organic silicone resin, 8 parts by weight of a filler, 80 parts by weight of an aggregate, 2 parts by weight of a ditertiarybutyl peroxide, 20 parts by weight of water, 0.5 parts by weight of an accelerator, 1 parts by weight of a vinyl palmitate, and 1 parts by weight of a methyl trifluoropropyl silicone oil.

The aggregate included 60 wt % coarse aggregate and 40 wt % fine aggregate, the coarse aggregate was basalt, the fine aggregate was expanded perlite, the particle size of the coarse aggregate was 5 mm, and the particle size of the fine aggregate was 0.1 mm; the filler included 20 wt % limestone and 80 wt % titanium nitride; and the accelerator was 60 wt % triethylenediamine and 40 wt % sulfolane.

A method for preparing a micro-surfacing sealing coat mixture, comprised:
(1) cationic emulsified asphalt, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 170° C. for 20 min, and then continuously sheared for 60 min at 3000 r/min to obtain a modified emulsified asphalt;
(2) the modified emulsified asphalt was cooled to 20° C., then limestone, titanium nitride, aggregate, and water were added thereto and the resulting mixture was sent to a mixer to mix evenly to obtain the micro-surfacing sealing coat mixture.

Comparative Example 2

A micro-surfacing sealing coat mixture, comprised the following raw materials in parts by weight: 10 parts by weight of a cationic emulsified asphalt, 5 parts by weight of an ethylene-1-octene copolymer, 8 parts by weight of a filler, 80 parts by weight of an aggregate, 2 parts by weight of a ditertiarybutyl peroxide, 20 parts by weight of water, 0.5 parts by weight of an accelerator, 1 parts by weight of a vinyl palmitate, and 1 parts by weight of a methyl trifluoropropyl silicone oil.

The aggregate included 60 wt % coarse aggregate and 40 wt % fine aggregate, the coarse aggregate was basalt, the fine aggregate was expanded perlite, the particle size of the coarse aggregate was 5 mm, and the particle size of the fine aggregate was 0.1 mm; the filler included 20 wt % limestone and 80 wt % titanium nitride; and the accelerator was 60 wt % triethylenediamine and 40 wt % sulfolane.

A method for preparing a micro-surfacing sealing coat mixture, comprised:
(1) cationic emulsified asphalt, ditertiarybutyl peroxide, ethylene-1-octene copolymer, triethylenediamine, sulfolane, vinyl palmitate, methyl trifluoropropyl silicone oil were weighed and sent to a high-speed shear emulsifier, the mixture was stirred at 170° C. for 20 min, and then continuously sheared for 60 min at 3000 r/min to obtain a modified emulsified asphalt;
(2) the modified emulsified asphalt was cooled to 20° C., then limestone, titanium nitride, aggregate, and water were added thereto and the resulting mixture was sent to a mixer to mix evenly to obtain the micro-surfacing sealing coat mixture.

Comparative Example 3

A micro-surfacing sealing coat mixture, comprised the following raw materials in parts by weight: 12 parts by weight of a cationic emulsified asphalt, 6 parts by weight of an ethylene-1-octene copolymer, 5 parts by weight of an organic silicone resin, 10 parts by weight of a filler, 85 parts by weight of an aggregate, 24 parts by weight of water, 1 parts by weight of an accelerator, 2 parts by weight of a vinyl palmitate, and 2 parts by weight of a methyl trifluoropropyl silicone oil.

The aggregate included 64 wt % coarse aggregate and 36 wt % fine aggregate, the coarse aggregate was limestone, the fine aggregate was diatomaceous earth, the particle size of the coarse aggregate was 8 mm, and the particle size of the fine aggregate was 0.5 mm; the filler included 24 wt % limestone and 76 wt % titanium nitride; and the accelerator included 63 wt % triethylenediamine and 37 wt % sulfolane.

A method for preparing a micro-surfacing sealing coat mixture, comprised:
(1) cationic emulsified asphalt, ethylene-1-octene copolymer, organic silicone resin, triethylenediamine, sulfolane, vinyl palmitate, methyl trifluoropropyl silicone oil were weighed and sent to a high-speed shear emulsifier, the mixture was stirred at 172° C. for 24 min, and then continuously sheared for 60 min at 3200 r/min to obtain a modified emulsified asphalt;
(2) the modified emulsified asphalt was cooled to 25° C., then limestone, titanium nitride, aggregate, and water were added thereto and the resulting mixture was sent to a mixer to mix evenly to obtain the micro-surfacing sealing coat mixture.

Comparative Example 4

A micro-surfacing sealing coat mixture, comprised the following raw materials in parts by weight: 12 parts by weight of a cationic emulsified asphalt, 6 parts by weight of an ethylene-1-octene copolymer, 5 parts by weight of an organic silicone resin, 10 parts by weight of a filler, 85 parts by weight of an aggregate, 3 parts by weight of a ditertiarybutyl peroxide, 24 parts by weight of water, 1 parts by weight of an accelerator, 2 parts by weight of a vinyl palmitate, and 2 parts by weight of a methyl trifluoropropyl silicone oil.

The aggregate was limestone, the particle size of the coarse aggregate was 8 mm; the filler included 24 wt % limestone and 76 wt % titanium nitride; and the accelerator included 63 wt % triethylenediamine and 37 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 172° C. for 24 min, and then continuously sheared for 60 min at 3200 r/min to obtain a modified emulsified asphalt;
(2) the modified emulsified asphalt was cooled to 25° C., then limestone, titanium nitride, aggregate, and water were added thereto and the resulting mixture was sent to a mixer to mix evenly to obtain the micro-surfacing sealing coat mixture.

Comparative Example 5

A micro-surfacing sealing coat mixture, comprised the following raw materials in parts by weight: 20 parts by weight of a cationic emulsified asphalt, 7 parts by weight of an ethylene-1-octene copolymer, 6 parts by weight of an organic silicone resin, 12 parts by weight of a filler, 90 parts by weight of an aggregate, 4 parts by weight of a ditertiarybutyl peroxide, 30 parts by weight of water, 2 parts by weight of an accelerator, 3 parts by weight of a vinyl palmitate, and 3 parts by weight of a methyl trifluoropropyl silicone oil.

The aggregate included 70 wt % coarse aggregate and 30 wt % fine aggregate, the coarse aggregate was basalt, the fine aggregate was cinder, the particle size of the coarse aggregate was 10 mm, and the particle size of the fine aggregate was 1 mm; the filler was limestone; and the accelerator included 65 wt % triethylenediamine and 35 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylenediamine, sulfolane, vinyl palmitate, methyl trifluoropropyl silicone oil were weighed and sent to a high-speed shear emulsifier, the mixture was stirred at 175° C. for 25 min, and then continuously sheared for 60 min at 3500 r/min to obtain a modified emulsified asphalt;
(2) the modified emulsified asphalt was cooled to 30° C., then limestone, aggregate, and water were added thereto and the resulting mixture was sent to a mixer to mix evenly to obtain the micro-surfacing sealing coat mixture.

Comparative Example 6

A micro-surfacing sealing coat mixture, comprised the following raw materials in parts by weight: 20 parts by weight of a cationic emulsified asphalt, 7 parts by weight of an ethylene-1-octene copolymer, 6 parts by weight of an organic silicone resin, 12 parts by weight of a filler, 90 parts by weight of an aggregate, 4 parts by weight of a ditertiarybutyl peroxide, 30 parts by weight of water, 2 parts by weight of an accelerator, 3 parts by weight of a vinyl palmitate, and 3 parts by weight of a methyl trifluoropropyl silicone oil.

The aggregate included 70 wt % coarse aggregate and 30 wt % fine aggregate, the coarse aggregate was basalt, the fine aggregate was cinder, the particle size of the coarse aggregate was 10 mm, and the particle size of the fine aggregate was 1 mm; the filler included 26 wt % limestone and 74 wt % titanium nitride; and the accelerator was triethylenediamine.

A method for preparing a micro-surfacing sealing coat mixture, comprised:
(1) cationic emulsified asphalt, ethylene-1-octene copolymer, organic silicone resin, ditertiarybutyl peroxide, sulfolane, vinyl palmitate, methyl trifluoropropyl silicone oil were weighed and sent to a high-speed shear emulsifier, the mixture was stirred at 175° C. for 25 min, and then continuously sheared for 60 min at 3500 r/min to obtain a modified emulsified asphalt;
(2) the modified emulsified asphalt was cooled to 30° C., then limestone, titanium nitride, aggregate, and water were added thereto and the resulting mixture was sent to a mixer to mix evenly to obtain the micro-surfacing sealing coat mixture.

Comparative Example 7

A micro-surfacing sealing coat mixture, comprised the following raw materials in parts by weight: 20 parts by weight of a cationic emulsified asphalt, 7 parts by weight of an ethylene-1-octene copolymer, 6 parts by weight of an organic silicone resin, 12 parts by weight of a filler, 90 parts by weight of an aggregate, 4 parts by weight of a ditertiarybutyl peroxide, 30 parts by weight of water, 2 parts by weight of an accelerator, 3 parts by weight of a vinyl palmitate, and 3 parts by weight of a methyl trifluoropropyl silicone oil.

The aggregate included 70 wt % coarse aggregate and 30 wt % fine aggregate, the coarse aggregate was basalt, the fine aggregate was cinder, the particle size of the coarse aggregate was 10 mm, and the particle size of the fine aggregate was 1 mm; the filler included 26 wt % limestone and 74 wt % titanium nitride; and the accelerator was 65 wt % triethylenediamine and 35 wt % sulfolane.

A method for preparing a micro-surfacing sealing coat mixture, comprised:
(1) cationic emulsified asphalt, ethylene-1-octene copolymer, organic silicone resin, ditertiarybutyl peroxide, triethylene diamine, sulfolane, and vinyl palmitate were weighed and sent to a high-speed shear emulsifier, the mixture was stirred at 175° C. for 25 min, and then continuously sheared for 60 min at 3500 r/min to obtain a modified emulsified asphalt;
(2) the modified emulsified asphalt was cooled to 30° C., then limestone, titanium nitride, aggregate, and water were added thereto and the resulting mixture was sent to a mixer to mix evenly to obtain the micro-surfacing sealing coat mixture.

The performance test results of the Examples and Comparative Examples were listed below:

| | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Appearance | Flat surface, lost, uniform, no loose, no exposed aggregate, no wheel tracks, no scratches | Flat surface, lost, uniform, no loose, no exposed aggregate, no wheel tracks, no scratches | Flat surface, lost, uniform, no loose, no exposed aggregate, no wheel tracks, no scratches | Flat surface, slightly loose, with wheel tracks, no scratches | Flat surface, lost, uniform, no loose, no exposed aggregate, with wheel tracks, slight scratches | Sligtly uneven surface, lost, uniform, no loose, a small amount of exposed aggregate | Flat surface, lost, uniform, no loose, no exposed aggregate, with wheel tracks, with scratches | Flat surface, lost, uniform, no loose, with exposed aggregate, with wheel tracks, with scratches | Flat surface, lost, uniform, loose, with exposed aggregate, with wheel tracks, with scratches | Flat surface, lost, uniform, no loose, with exposed aggregate, with wheel tracks, no scratches |
| Softening Point (° C.) | 114 | 121 | 127 | 102 | 110 | 104 | 117 | 124 | 112 | 124 |
| Elongation at break | 240 | 248 | 255 | 214 | 217 | 223 | 247 | 251 | 212 | 245 |
| Marshall stability (KN) | 9.7 | 10.2 | 11.3 | 9.2 | 7.8 | 10.1 | 9.6 | 8.7 | 9.1 | 10.5 |
| Water permeability coefficient (ml/min) | 10 | 8 | 6 | 14 | 20 | 31 | 24 | 15 | 9 | 24 |
| Transverse joint | End-to-end joint, smooth | End-o-end joint, smooth | End-to-end joint, smooth | End-to-end joint, smooth | End-to-end joint, smooth | Not smooth | Not smooth | End-to-end joint, smooth | Not smooth | End-to-end joint, smooth |
| Longitudinal joint | Uneven, < 6 mm | Uneven, < 6 mm | Uneven, < 6 mm | Uneven, < 12 mm | Uneven, < 6 mm | Uneven, < 10 mm | Uneven, < 12 mm | Uneven, < 6 mm | Uneven, < 10 mm | Uneven, < 6 mm |

It can be seen from the above examples that the prepared material not only has excellent resistance to water wash-off, but also has better anti-permeability and stress buffering properties than the materials of the comparative examples. The micro-surfacing sealing coat mixture of the present disclosure can delay the generation of reflective cracks and realize the limited sliding of the cement concrete pavement on the multi-efficiency connecting layer.

Although the embodiments of the present disclosure have been disclosed as above, they are not limited to the applications listed in the description and embodiments. It can be applied to various fields suitable for the present disclosure. For those skilled in the art, additional modifications can be easily implemented, so the present disclosure is not limited to specific details without departing from the general concept defined by the claims and equivalent scope.

What is claimed is:

1. A micro-surfacing sealing coat mixture, comprising the following raw materials in parts by weight:
   10-20 parts by weight of a cationic emulsified asphalt, 5-7 parts by weight of an ethylene-1-octene copolymer, 3-6 parts by weight of an organic silicone resin, 8-12 parts by weight of a filler, 80-90 parts by weight of an aggregate, 2-4 parts by weight of a ditertiarybutyl peroxide, 20-30 parts by weight of water, and 0.5-2 parts by weight of an accelerator.

2. The micro-surfacing sealing coat mixture according to claim 1, wherein the aggregate comprises 60-70 wt % of coarse aggregate and 30-40 wt % of fine aggregate.

3. The micro-surfacing sealing coat mixture according to claim 2, wherein the coarse aggregate is basalt or limestone.

4. The micro-surfacing sealing coat mixture according to claim 2, wherein the fine aggregate is expanded perlite, diatomaceous earth, or cinder.

5. The micro-surfacing sealing coat mixture according to claim 2, wherein the particle size of the coarse aggregate is 5-10 mm, and the particle size of the fine aggregate is 0.1-1 mm.

6. The micro-surfacing sealing coat mixture according to claim 1, wherein the filler comprises 20-26 wt % limestone and 74-80 wt % titanium nitride.

7. The micro-surfacing sealing coat mixture according to claim 1, wherein the accelerator comprises 60-65 wt % of triethylene diamine and 35-40 wt % of sulfolane.

8. The micro-surfacing sealing coat mixture according to claim 1, wherein the sealing coat mixture further comprises 1-3 parts by weight of vinyl palmitate.

9. The micro-surfacing sealing coat mixture according to claim 1, wherein the sealing coat mixture further comprises 1-3 parts by weight of methyl trifluoropropyl silicone oil.

10. A method for preparing the micro-surfacing sealing coat mixture according to claim 1, comprising:
    (1) weighing cationic emulsified asphalt, ethylene-1-octene copolymer, organic silicone resin, ditertiarybutyl peroxide, triethylenediamine, sulfolane, vinyl palmitate and methyl trifluoropropyl silicone oil, sending them to a high-speed shear emulsifier, stirring at 170-175° C. for 20-25 min, and then continuously shearing for 60 min at 3000-3500 r/min to obtain a modified emulsified asphalt;
    (2) cooling the modified emulsified asphalt to 20-30° C., adding limestone, titanium nitride, aggregate, and water thereto and sending the resulting mixture to a mixer to mix evenly to obtain the micro-surfacing sealing coat mixture.

11. The method according to claim 10, wherein the aggregate comprises 60-70 wt % of coarse aggregate and 30-40 wt % of fine aggregate.

12. The method according to claim 11, wherein the coarse aggregate is basalt or limestone.

13. The method according to claim 11, wherein the fine aggregate is expanded perlite, diatomaceous earth, or cinder.

14. The method according to claim 11, wherein the particle size of the coarse aggregate is 5-10 mm, and the particle size of the fine aggregate is 0.1-1 mm.

15. The method according to claim 10, wherein the filler comprises 20-26 wt % limestone and 74-80 wt % titanium nitride.

16. The method according to claim 10, wherein the accelerator comprises 60-65 wt % of triethylene diamine and 35-40 wt % of sulfolane.

17. The method according to claim 10, wherein the sealing coat mixture further comprises 1-3 parts by weight of vinyl palmitate.

18. The method according to claim 10, wherein the sealing coat mixture further comprises 1-3 parts by weight of methyl trifluoropropyl silicone oil.

* * * * *